US007173658B2

(12) United States Patent
Kikuchi

(10) Patent No.: US 7,173,658 B2
(45) Date of Patent: Feb. 6, 2007

(54) ARRANGING A PLURALITY OF IMAGING PIXELS IN AN IMAGING ACQUISITION APPARATUS

(75) Inventor: Susumu Kikuchi, Hachioji (JP)

(73) Assignee: Olympus Corporation, Tokyo (JP)

(*) Notice: Subject to any disclaimer, the term of this patent is extended or adjusted under 35 U.S.C. 154(b) by 1000 days.

(21) Appl. No.: 10/105,615

(22) Filed: Mar. 25, 2002

(65) Prior Publication Data
US 2002/0180877 A1 Dec. 5, 2002

(30) Foreign Application Priority Data
Mar. 26, 2001 (JP) ............................ 2001-088380

(51) Int. Cl.
- H04N 5/335 (2006.01)
- H04N 9/083 (2006.01)
- H04N 7/18 (2006.01)
- H04N 9/74 (2006.01)
- G06K 9/32 (2006.01)
- G09G 5/02 (2006.01)

(52) U.S. Cl. .................. 348/275; 348/147; 348/580; 382/293; 345/694

(58) Field of Classification Search ............ 348/36, 348/37, 38, 39, 147, 315, 274, 275, 280, 348/281, 282, 30, 442, 580; 382/274, 276, 382/293; 345/698, 694
See application file for complete search history.

(56) References Cited

U.S. PATENT DOCUMENTS

| | | | |
|---|---|---|---|
| 4,267,573 A * | 5/1981 | Chaikin et al. ............. 382/296 |
| 4,554,585 A * | 11/1985 | Carlson ....................... 348/342 |
| 4,574,311 A * | 3/1986 | Resnikoff et al. ............ 348/315 |
| 5,166,511 A * | 11/1992 | Kreider et al. ............ 250/208.1 |
| 5,489,940 A * | 2/1996 | Richardson et al. ......... 348/315 |
| 5,508,734 A * | 4/1996 | Baker et al. .................. 348/36 |
| 5,739,852 A * | 4/1998 | Richardson et al. ......... 348/315 |
| 5,818,527 A * | 10/1998 | Yamaguchi et al. ......... 348/335 |
| 6,147,709 A * | 11/2000 | Martin et al. ................ 348/239 |
| 6,201,574 B1 * | 3/2001 | Martin ......................... 348/315 |
| 6,243,131 B1 * | 6/2001 | Martin ........................... 348/36 |

(Continued)

FOREIGN PATENT DOCUMENTS

JP 11-168688 6/1999

OTHER PUBLICATIONS

Bolduc et al.; "Fast Computation of Multiscalar Symmetry in Foveated Images"; Sep. 18-20, 1995; Computer Architectures for Machine Perception, 1995.; pp. 2-11.*

(Continued)

Primary Examiner—John M. Villecco
(74) Attorney, Agent, or Firm—Straub and Pokotylo; John C. Pokotylo

(57) ABSTRACT

An image acquisition apparatus has an imaging optical system. An imaging section has a plurality of imaging pixels arranged at non-uniform intervals within an imaging surface. The imaging section picks up an object image imaged by the imaging optical system, and converts the object image into image signals. An image restoration processing section has a coefficient memory in which a predetermined coefficient sequence is recorded, and an image restoration processing circuit which carries out computation processing between the coefficient sequence recorded in the coefficient memory and the image signals from the imaging section. The image restoration processing section generates an image in a desired display pixel arrangement.

22 Claims, 8 Drawing Sheets

U.S. PATENT DOCUMENTS

| | | | |
|---|---|---|---|
| 6,538,691 B1 * | 3/2003 | Macy et al. | 348/222.1 |
| 6,563,101 B1 * | 5/2003 | Tullis | 250/208.1 |
| 6,803,955 B1 * | 10/2004 | Yosida | 348/273 |
| 6,873,338 B2 * | 3/2005 | Berstis | 345/596 |
| 7,009,645 B1 * | 3/2006 | Sandini et al. | 348/275 |

OTHER PUBLICATIONS

Suematsu et al.; "An Advanced Vision Sensor with Fovea"; Nov. 27-30, 1990; 16th Annual Conference of IEEE Industrial Electronics Society, 1990. IECON '90.; vol. 1; pp. 581-585.*

Rojer et al.; "Design Considerations for a Space-Variant Visual Sensor with Complex Logarithmic Geometry"; Jun. 16-21, 1990; 10th International Conference on Pattern Recognition, 1990. Proceedings., vol. ii, pp. 278-285 vol. 2.*

Questa et al.; "Time to Contact Computation with a Space-Variant Retina-like C-mos Sensor"; Nov. 4-8, 1996; Proceedings of the 1996 IEEE/RSJ International Conference on Intelligent Robots and Systems '96, IROS 96, vol. 3, pp. 1622-1629 vol. 3.*

Sandini et al.; "A Retina-like CMOS Sensor and its Applications"; Mar. 16-17, 2000; Proceedings of the 2000 IEEE Sensor Array and Multichannel Signal Processing Workshop. 2000. pp. 514-519 □□.*

Pardo et al.; "Space-Variant Nonorthogonal Structure CMOS Image Sensor Design"; Jun. 1998; IEEE Journal of Solid-State Circuits, vol. 33, Issue 6, pp. 842-849 □□.*

* cited by examiner

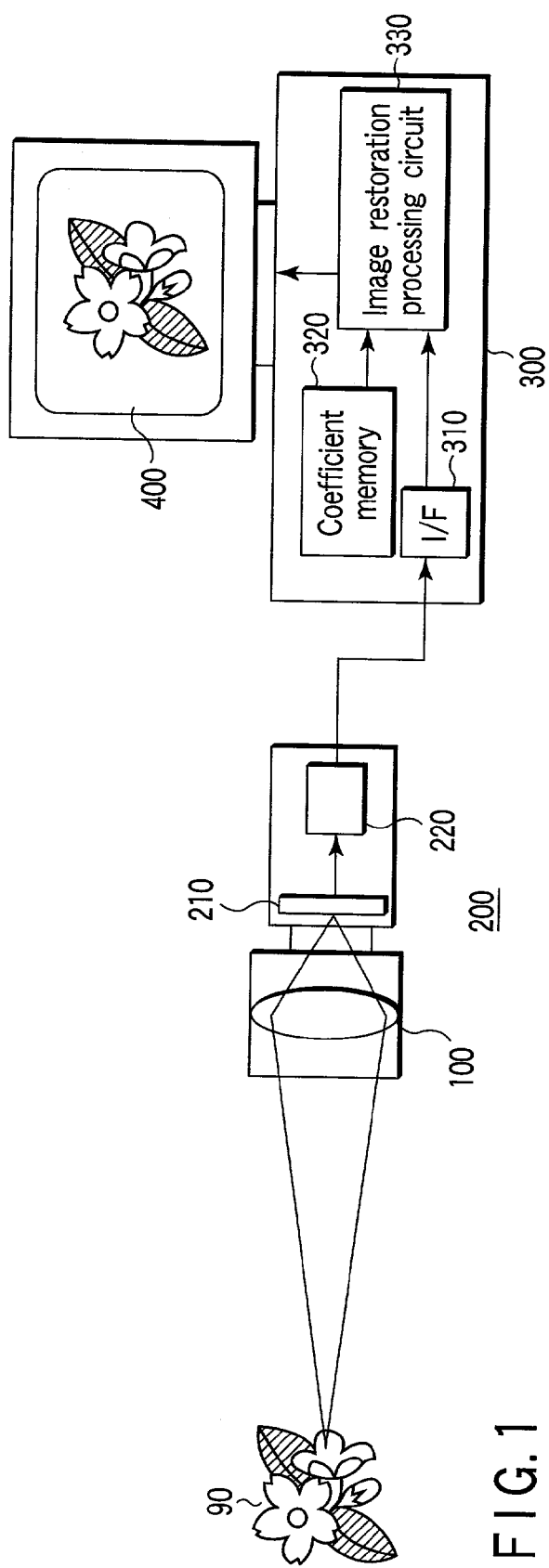
F I G. 1
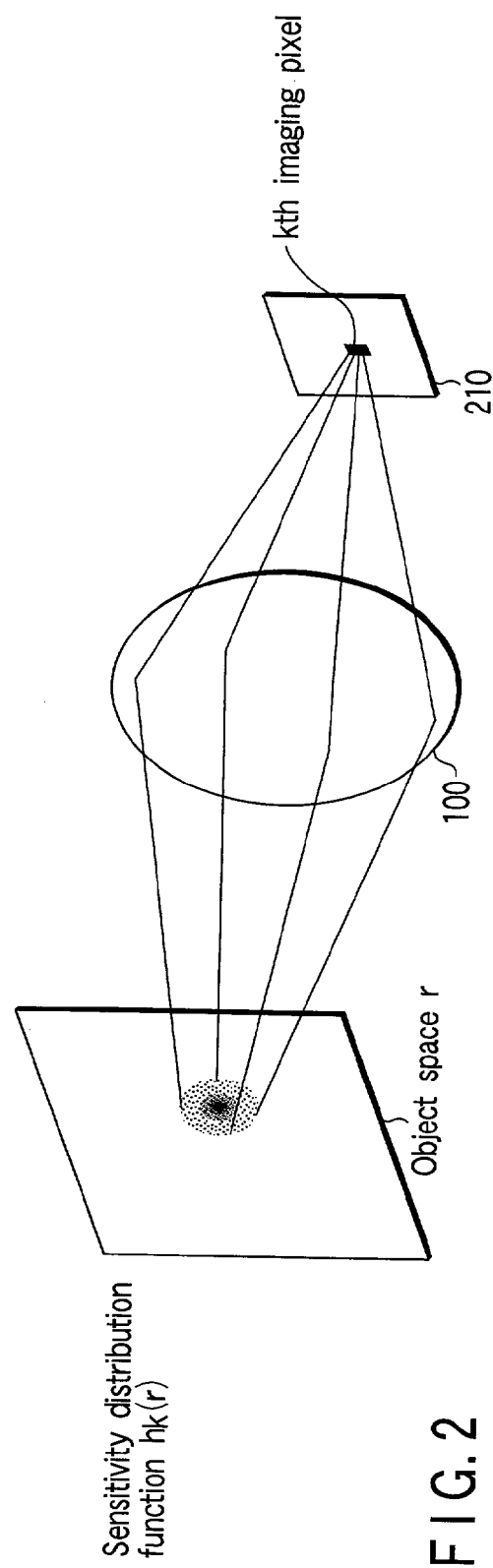
F I G. 2

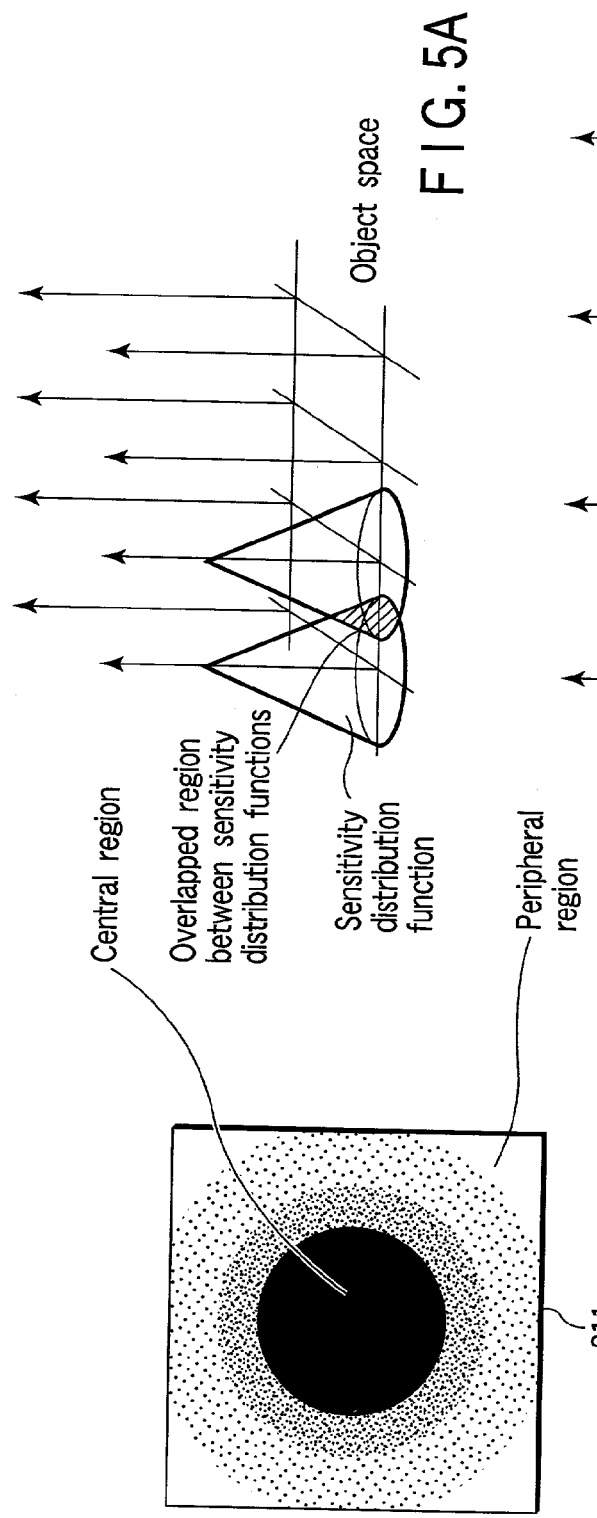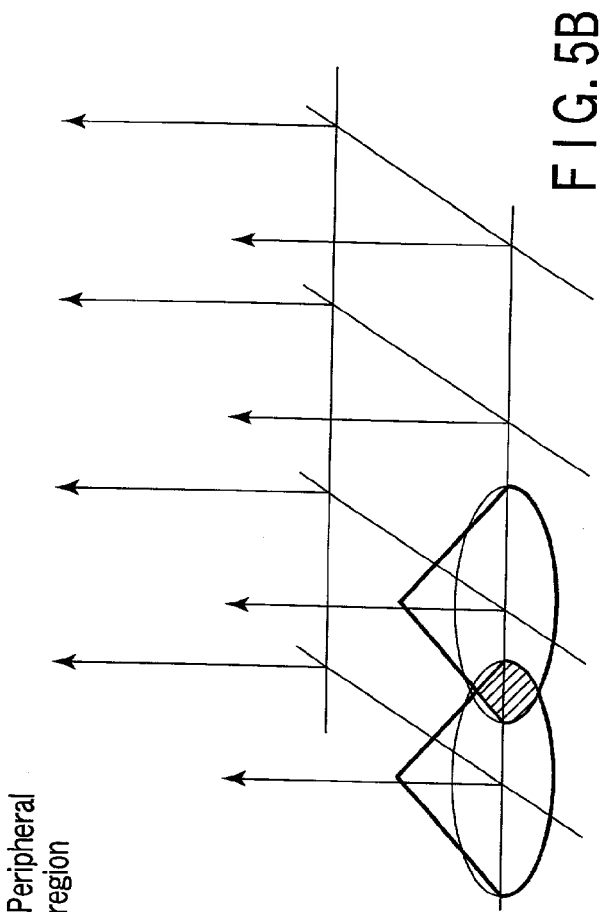

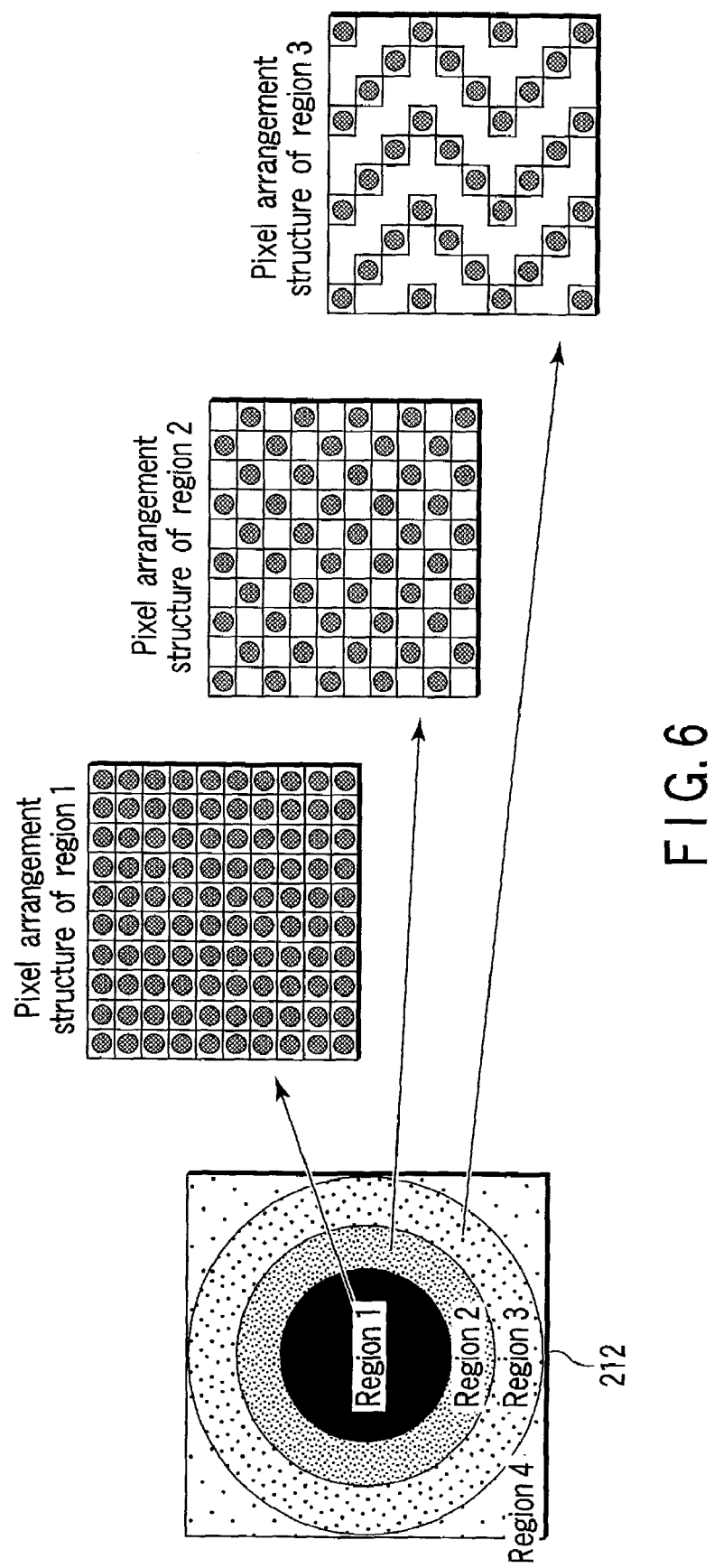
F I G. 6

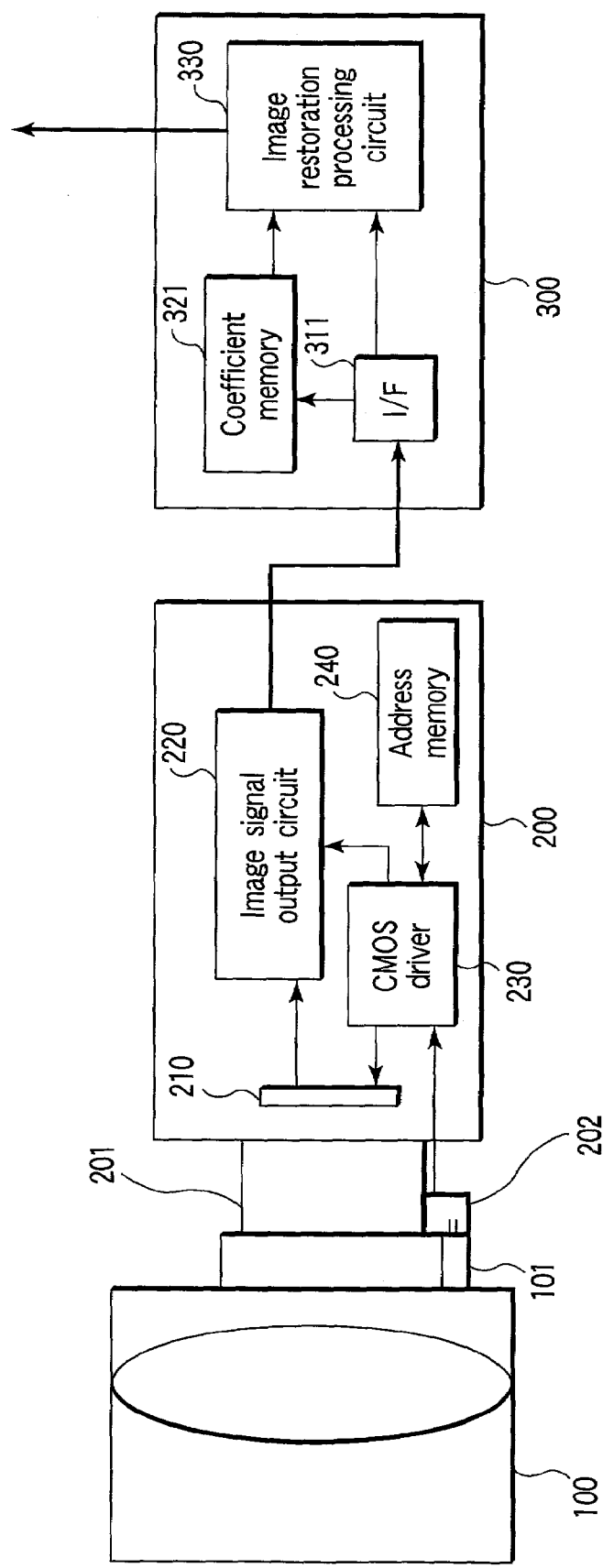
F I G. 11

ARRANGING A PLURALITY OF IMAGING PIXELS IN AN IMAGING ACQUISITION APPARATUS

CROSS-REFERENCE TO RELATED APPLICATIONS

This application is based upon and claims the benefit of priority from the prior Japanese Patent Application No. 2001-088380, filed Mar. 26, 2001, the entire contents of which are incorporated herein by reference.

BACKGROUND OF THE INVENTION

1. Field of the Invention

The present invention relates to an image acquisition apparatus.

2. Description of the Related Art

In the technical field of image acquisition, in a solid-state imaging element such as a CCD, generally, the respective imaging pixels are arranged in a square lattice form. Further, the output image signal from a camera formed by using such imaging elements is converted into and used in an appropriate time-series signal format in accordance with the application. For example, if the camera is a camera for movies, the image signal is output by an analog video format such as NTSC or S-VHS or the like, and is displayed on a monitor. If the camera is a digital still camera, the image signal is converted into a digital signal and is recorded onto a medium such as an IC card or the like. However, the signal processing in such processes is limited to format conversion processing or inter-polation processing, or to color conversion processing, edge enhancing processing or the like for improving the appearance. The obtained image is structured in direct accordance with the arrangement of the imaging pixels.

Namely, in the above-described ordinary imaging/display system, assuming that the display device such as a monitor is structured by discrete display pixels, it can be thought that the imaging pixels and the display pixels are both arranged in square lattice forms and are in a one-to-one correspondence. Note that, in the present specification, even when different sampling intervals are set for two orthogonal directions in a plane, for the convenience of explanation, it is called a square lattice. If an attempt is made to carry out transfer or recording efficiently in such a system, a digital image data compression technique, e.g., the MPEG standard for movies or the JPEG standard for static images, is used. In other words, the arrangement of the pixels and the number of the pixels of the image acquisition section and the image output section are made equal, and carrying out compression conversion at a transfer/recording section along the way can be considered.

In contrast, examples have been proposed in which the imaging pixels are disposed uniquely, and not in a square lattice form. As one such conventional example, a structure of a digital still camera using imaging elements structured by a pixel shifted arrangement (a honeycomb arrangement) is disclosed in Jpn. Pat. Appln. KOKAI Publication No. 11-168688. This publication discloses a method in which the number of pixels is increased through interpolation processing on an input signal by imaging pixels in a honeycomb arrangement, and a square lattice arrangement is formed. In accordance with this method, an image appearing to be more highly detailed when viewed can be generated with a limited number of pixels, and the predominance of the imaging section in the structure is emphasized. Further, although the JPEG compression technique is employed in this camera as well, attention is focused on the point that the arrangement of the pixels and the number of the pixels are fundamentally different at the image acquisition section and the image output section.

Conventional solid-state imaging elements are generally structured by imaging pixels arranged in a square lattice form. It can be thought that, in an imaging/display system used by a camera using such imaging elements, the imaging pixel arrangement and the display pixel arrangement are substantially in a one-to-one correspondence. However, in such a system, if there are any constraints on the imaging section, e.g., even if it is necessary to form a camera whose usable space is extremely small, a pixel structure which is equivalent to that of the display section is required for the imaging section.

Further, in a case where the capacity of the signal is limited because the transfer band of the image signal is narrow, when a conventional digital image data compression method must be employed, an image structure of a sufficiently large scale is required regardless of the imaging elements, and further, a processor which realizes digital compressing functions must be loaded at the imaging section. With such a system, it is extremely difficult to realize, for example, a system monitoring detailed functions in industrial facilities, visual functions of microrobots, extremely minute endoscopes used in medical diagnosis, or the like.

On the other hand, a camera utilizing a honeycomb arrangement is a conventional example in which constraints on the imaging section are eased due to the pixel arrangement of the imaging elements being freed from the square lattice. However, in this example as well, there is ultimately no change in imaging by a uniform sampling rate within the imaging surface, and the number of pixels which can be eliminated is at most half.

Moreover, because the image restoration processing is simple interpolation processing, it is only applicable to cases where the imaging pixels are arranged uniformly and systematically. Namely, no method has been proposed which, even when, due to some constraint, only a lens having inferior performances can be loaded and the spatial frequency transfer characteristics differ greatly due to the position within the imaging surface, is suited for such conditions, and also can carry out efficient imaging by arranging pixels irregularly. In addition, there has been no clear disclosure of an interpolation method suited for irregular pixel arrangements.

In this way, there has not been proposed a method which improves the degrees of freedom in design of the imaging section under strict constraints, by completely correlating the imaging optical system and the imaging pixel arrangement and the restoration processing in a conventional imaging/display system using solid-state imaging elements.

BRIEF SUMMARY OF THE INVENTION

Accordingly, an object of the present invention is to provide an image acquisition apparatus which, by totally relating an imaging optical system, an imaging element arrangement and a restoration processing, improves the degrees of freedom in design of an imaging section under strict constraints.

In order to achieve the above-described object, an image acquisition apparatus according to a first aspect of the present invention comprises:

an imaging optical system;

an imaging section which has a plurality of imaging pixels disposed at non-uniform intervals within an imaging surface, and picks up an object image imaged by the imaging optical system to convert the object image into image signals; and an image restoration processing section which has a coefficient memory in which a predetermined coefficient sequence is recorded, and an image restoration processing circuit which carries out computation processing between the coefficient sequence recorded in the coefficient memory and the image signals from the imaging section, the image restoration processing section generating an image in a desired display pixel arrangement.

Further, an image acquisition apparatus according to a second aspect of the present invention comprises:

an imaging optical system selected from a plurality of types of imaging optical systems;

an imaging section which has a plurality of imaging pixels disposed at uniform intervals in an imaging surface, and picks up an object image imaged by the imaging optical system to convert the object image into image signals;

a specifying section which specifies an imaging pixel corresponding to a type of the selected imaging optical system; and an image restoration processing section which has a coefficient memory in which a predetermined coefficient sequence is recorded, and an image restoration processing circuit which reads out a coefficient sequence corresponding to the type of the selected imaging optical system from the coefficient memory and which carries out computation processing between the read-out coefficient sequence and the image signal from the imaging section, the image restoration processing section generating an image in a desired image display pixel arrangement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an overall structural view of an image acquisition apparatus according to a first embodiment of the present invention.

FIG. 2 is a diagram for explaining the gist of a sensitivity distribution function.

FIGS. 5A, 5B and 5C are diagrams for explaining an example of a pixel arrangement of a CMOS imaging element 211 in which the density seamlessly decreases in accordance with moving from the center to the edge portion of the imaging surface.

FIG. 6 is a diagram for explaining another example of a pixel arrangement of the CMOS imaging element 211.

FIG. 11 is a diagram showing a structure of an image acquisition apparatus according to a fourth embodiment of the present invention.

DETAILED DESCRIPTION OF THE INVENTION

Figure 3:
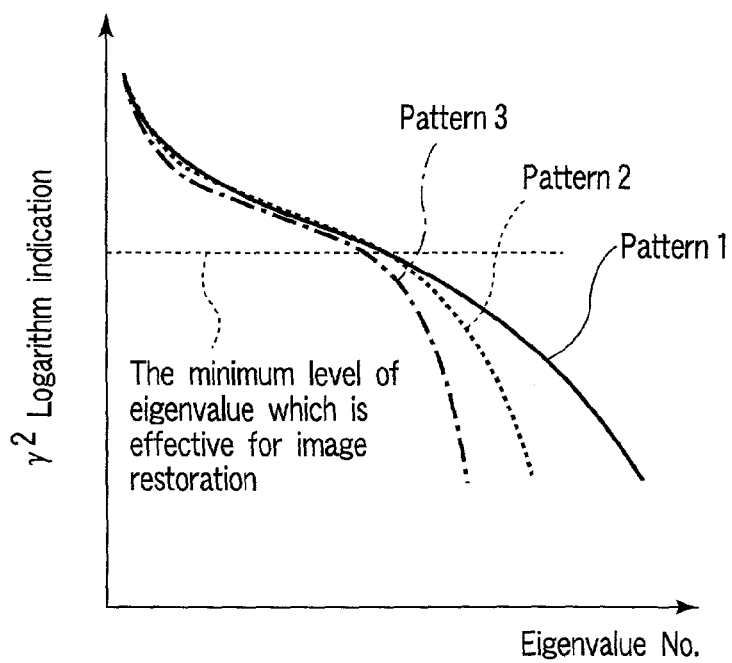
FIG. 3 is a graph for explaining which pixel arrangement has the most effective imaging among three types of imaging pixel arrangements of pattern 1, pattern 2, and pattern 3.

Hereinafter, embodiments of the present invention will be described in detail with reference to the drawings.

(First Embodiment)

FIG. 1 is an overall structural view of an image acquisition apparatus according to a first embodiment of the present invention. The image acquisition apparatus is structured from a lens 100 as an imaging optical system, an imaging section 200, an image restoration processor 300 as an image restoration processing section, and a monitor 400.

An image of an object 90 imaged by the lens 100 is photoelectrically converted by an imaging element 210 in the imaging section 200, and is converted to an appropriate image signal in an image signal output circuit 220, and is outputted.

At the image restoration processor 300, the image signal from the imaging section 200 is inputted via an interface (I/F) 310, and is transferred to an image restoration processing circuit 330. Note that, when the sent image signal is an analog signal, the signal is converted to an appropriate digital signal in the I/F 310. On the other hand, coefficients suiting the conditions of the present system are recorded in a coefficient memory 320, these coefficients are transferred to the image restoration processing circuit 330, and a predetermined computation processing is carried out between the coefficients and the digital image signal, and an image signal is synthesized. The final image signal is displayed on the monitor 400.

Arrangements of the imaging pixels of the CMOS imaging element 210 will be described later with reference to FIG. 3 and FIG. 4. Further, the detailed structure and effects of the image restoration processor 300 will be described later as well.

Hereinafter, in accordance with the first embodiment, the principles of the present invention and the effects based thereon will be described. First, a definition of a continuous-to-discrete system will be described with reference to FIG. 1. A system, in which the image of the object 90 is imaged on the imaging surface of the CMOS imaging element 210 in the imaging section 200 by an imaging optical system using the lens 100, is a continuous system.

At the CMOS imaging element 210, because the image of the object 90 is converted into an image signal by being photoelectrically converted pixel-by-pixel, it can be considered that the information of the continuous system is spatially discretized in this process. Moreover, although the brightness level as well is discretized (quantized) and digital signal processing is carried out thereon at the image restoration processor 300, the spatial continuous-to-discrete relation is more substantial in the overall system. Thus, hereinafter, the relation between the continuous system expressing imaging by the lens 100 and the discrete system by the imaging section 200 and the image restoration processor 300 will be described.

Conventionally, such a continuous-to-discrete relation is defined by the sampling theorem. The sampling theorem is a theorem which provides conditions for completely discretizing a band-limited signal without any omission of information, and is detailed, for example, in the reference "J. W. Goodman, 2–3 Two-dimensional Sampling Theory, Introduction to Fourier Optics, pp. 21–25, (McGRAW-HILL; San Francisco; 1968)". However, this theorem is established only when the transfer characteristics are shift invariant. Further, because the window function of the band limit is defined by a rectangular (rect) function in the sampling theorem for a one-dimensional signal, the interpolation function in actual space is a sinc function which is the Fourier transformation thereof.

As a characteristic of this function, the zero point appears due to regular periods. However, it is known that, in the sampling theorem, the zero point of the sinc function as an interpolation function always comes on the sampling points set at uniform intervals.

(Refer to the Aforementioned Reference.)

This property shows that each pixel may be independently sampled without considering the effects of the adjacent pixels at the time of discretizing a band-limited continuous signal, and in actuality, is extremely convenient. Accordingly, when the sampling theorem is expanded two-dimensionally, this advantage is enjoyed by applying the one-dimensional sampling theorem respectively along two axes orthogonal in a surface. As a result, usually, a two-dimensional image is generally discretized by sampling points in a square lattice form.

When considering applying such principles to the present embodiment, the following interpretation is obtained. Namely, in an imaging optical system such as that shown in FIG. 1, receipt and observation of some deterioration can be considered due to the image of the object 90 being convolution computed (convoluted) with the spatial transfer function. The sampling theorem can be applied if this spatial transfer function is uniform (shift invariant) at all positions within the imaging surface. In this case, in order to completely discretize the image, a sampling interval of the minimum limit necessary is required, and it suffices for sampling to be carried out at uniform intervals under uniform conditions at all positions of the imaging surface. Further, the sampling points are usually arranged in a square lattice form.

However, generally, there are effects such as aberration or the like on the imaging optical system. Thus, it is not always the case that the spatial transfer characteristic is uniform in the imaging surface. This trend becomes marked in particular in an imaging device in which only an imaging optical system, having poor performances such as a single lens or the like, can be loaded under any constraining conditions. In such cases, for example, even if the spatial frequency band becomes lower in accordance with nearing the periphery of the imaging surface, if sampling is carried out under the same conditions at the central portion and the peripheral portions, there may be oversampling on the whole, and useless information may be input.

Accordingly, when an attempt is made to carry out appropriate sampling without waste, a non-uniform interval sampling method, and principles of a method of restoring an observation signal, inputted under such conditions, to an image are needed. Here, in the present embodiment, thinking is based on the principles of a continuous-to-discrete system such as described hereinafter. An example of a reference document is "N. Ohyama, M. Mimura, T. Obi, and M. Yamaguchi, Image reconstruction based on continuous-to-discrete mapping model, H. Ohzu and S. Komatsu eds., Optical Methods in Biomedical and Environmental Sciences, pp. 55–58, (Elsevier; Amsterdam; 1994)".

In the principles shown in this document, a continuous-to-discrete system is defined by the following simple relational expression:

$$g_k = \int_A f(r) h_k(r) dr \quad k=1,2,\ldots,N \qquad (1)$$

wherein $g_k$ is an observed value of the kth imaging element in the CMOS imaging element 210;

N is a total number of imaging pixels of the CMOS imaging element 210;

f(r) is an original image of the object defined in a continuous vector space;

$h_k$(r) is a sensitivity distribution function for the kth imaging pixel of the CMOS imaging element 210; and A is an integral range corresponding to the constraint region of the object.

Further, in formula (1), r is a vector.

The sensitivity distribution function $h_k$(r) defined in the above formula is a function expressing the light intensity distribution in the object space inputted to the kth imaging pixel, and makes the discrete system relate to the continuous system.

FIG. 2 is a diagram for explaining the gist of the sensitivity distribution function. Further, formula (1) is expressed by the following formula when applied to a linear algebraic relation in a discrete system:

$$g = H\{f(r)\} \quad (r \text{ is a vector}) \qquad (2)$$

wherein $$g = [g_1 g_2 \ldots g_N]^t \qquad (2\text{-}1).$$

g is an observation vector, and the observation values of all of the imaging pixels in the CMOS imaging element 210 are defined as factors.

$$H\{\;\} = [h_1(r) h_2(r) \ldots h_N(r)]^t \quad (r \text{ is a vector}) \qquad (2\text{-}2)$$

is a continuous-to-discrete observation operator, and is defined as a general matrix in which the sensitivity distribution function is arranged in the row direction. Namely, the above is a linear operator which is discrete in the column direction and continuous (an infinite number of factors exist) in the row direction.

Because above formulas (1) and (2) express basically linear systems, it is assumed that the image restoration processing in a discrete system also is carried out by linear computation, and following formula (3) is defined.

$$f' = S\{f'(r)\} (r \text{ is a vector}) \qquad (3)$$

wherein f^c expresses a restored discrete image, and is an M dimensional vector;

f^c(r) expresses a restored continuous image; and

S{ } expresses a continuous-to-discrete resampling operator.

Formula (3) expresses a process in which, from the relation defined by formulas (1) and (2), first, the original image f^c(r) defined in the continuous system is restored, and finally, by sampling this again, a discretized restored image f^c is determined. However, because restoring a continuous image merely by digital computation processing is realistically impossible, the restored continuous image f^c(r) defined by formula (3) can be thought, for the time being, as being a hypothetical function.

The continuous-to-discrete resampling operator S{ } is an operator for converting a continuous image into a discrete image structured by M pixels. The arrangement of the pixels and the number M of pixels may be set appropriately in accordance with the application. Usually, because the image signal is transferred to a display system, the arrangement of the pixels and the number M of pixels are defined by square lattice sampling by an appropriate number of pixels.

Next, an SVD (Singular Value Decomposition) pseudo-inverse matrix solution method broadly defined for the continuous-to-discrete system is applied as the method of determining the restored image f^c(r). Note that the pseudo-inverse matrix type restoring method based on SVD conversion is defined as a computation method in a discrete system. However, because the continuous-to-discrete system expressed by formulas (1) and (2) is fundamentally linear, it can be broadly defined as is as follows:

$$f^c(r) = H^t\{(HH^t)^-\{g\}\}(r \text{ is a vector}) \quad (4)$$

wherein $(HH^t)^-$ is a generalized pseudo-inverse matrix operator; and $H^t\{\ \}$ is a discrete-to-continuous transposition operator.

In the above formula, when the continuous-to-discrete observation operator H{ } defined above is interpreted as a broadly defined matrix, its own transposition operator $H^t\{\ \}$ and the matrix product $HH^t\{\ \}$ become a completely discrete matrix by N×N elements.

Here, matrix $HH^t\{\ \}$ will be called a characteristic matrix of the continuous-to-discrete observation operator H{ }. When a pseudo-inverse matrix $(HH^t)^-\{\ \}$ described later is defined for this characteristic matrix $HH^t\{\ \}$, the process $(HH^t)^-\{g\}$ corresponds to computation in the discrete system, i.e., to digital processing, and the N-dimensional vector g is converted to another N-dimensional vector.

Then, finally, in the process of determining the continuous restored image f^c(r) by converting this vector to a continuous system, it can be interpreted as the discrete-to-continuous transposition operator $H^t\{\ \}$ being operated.

Here, the method of determining the pseudo-inverse matrix for the characteristic matrix $HH^t\{\ \}$ will be shown. First, the eigenequation of the characteristic matrix $HH^t\{\ \}$ will be considered:

$$HH^t\{\ \} = V\Gamma^2 V^t \quad (5)$$

wherein $$V = [v_1 v_2 \ldots v_N] \quad (5\text{-}1)$$

V is a SVD eigenmatrix, and is formed by the N-dimensional SVD eigenvectors $v_i, i=1, 2, \ldots, N$.

$$\Gamma^2 = \begin{bmatrix} \gamma_1^2 & & & \\ & \gamma_2^2 & & \\ & & \ldots & \\ & & & \gamma_N^2 \end{bmatrix} \quad (5\text{-}2)$$

$\Gamma^2$ is the SVD eigenvalue matrix, and is structured by N SVD eigenvalues $\gamma_i^2 i=1, 2, \ldots, N$ being aligned at the diagonal components.

By using the relationship of the above formula, the pseudo-inverse matrix $(HH^t)^-\{\ \}$ is defined as follows.

$$(HH^t)^-\{\ \} = V(\Gamma^2)^{-1} V^t \quad (6)$$

wherein $$(\Gamma^2)^{-1} = \begin{bmatrix} 1/\gamma_1^2 & & & \\ & 1/\gamma_2^2 & & \\ & & \ldots & \\ & & & 1/\gamma_N^2 \end{bmatrix} \quad (6\text{-}1)$$

Note that, in above formulas (5) and (6), in order to make the discussion simple, a case where the characteristic matrix $HH^t\{\ \}$ is non singular is supposed. However, in actuality, there are many cases where the rank R of the characteristic matrix $HH^t\{\ \}$ is smaller than N and is singular. Accordingly, in that case, the SVD pseudo-inverse matrix is defined by using the SVD eigenvectors $V_i, i=1, 2, \ldots R$ of the rank R or less, and the SVD eigenvalues $\gamma_i^2 i=1, 2, \ldots R$.

Further, when the SVD eigenvalue $\gamma_i^2$ has a small value, the reciprocal $1/\gamma_i^2$ becomes an extremely large value as can be predicted from formula (6-1). Thus, by emphasizing more than necessary the SVD eigenvector corresponding thereto, there is the possibility that the restored image will have much noise. In order to decrease such effects, an operation called non-singularization is carried out.

Considering the above, the pseudo-inverse matrix $(HH^t)^-\{\ \}$ of formula (6) can be newly defined by the following pseudo-inverse matrix $(HH^t)^+\{\ \}$:

$$(HH^t)^+\{\ \} = V_R(\Gamma_R^2 + \alpha I_R)^{-1} V_R^t \quad (7)$$

where $$V_R = [v_1 v_2 \ldots v_R] \quad (7\text{-}1).$$

$V_R$ is the SVD eigenmatrix defined in the case of rank R, and is structured by the N-dimensional SVD eigenvectors $v_i$ i=1, 2, . . . , R.

$\Gamma_R^2$ is the SVD eigenvalue matrix defined in the case of rank R, and is an R×R matrix structured by the R SVD eigenvalues $\gamma_i^2$ i=1, 2, . . . , R being aligned at the diagonal components.

α is a non-singularizing parameter, and an appropriate value is set transcendentally.

$I_R$ is an R×R unit matrix.

In this way, the continuous restored image f^c(r) (r is a vector) is determined by formula (4), and the discrete restored image f^c is derived by applying formula (3). However, because these restoration processings are all carried out in the discrete system, ultimately, the process of determining the discrete restored image $f^c$ from the observed vector g results in a linear process in the discrete system as follows.

$$f^c = Bg = S\{f^c(r)\} = S\{H^t\{(HH^t)^-\{g\}\}\} \quad (8)$$

wherein B is an M×N restoration matrix.

Although the present embodiment is based on the above principles of image restoration in a continuous-to-discrete system, the gist of the present invention can be summarized by the following two points.

1. Proposing a non-uniform interval sampling method of carrying out efficient image acquisition for cases where the spatial transfer function of the imaging optical system is shift variant.

2. Proposing a method of restoring an image sampled in a square lattice form, by using a discrete image signal input by non-uniform interval sampling.

Hereinafter, the above two points will be described in detail.

First, the non-uniform interval sampling method of carrying out efficient image acquisition for cases where the spatial transfer frequency of the imaging optical system is shift variant of 1. will be described. In the above definition of a continuous-to-discrete system, the conditions of shift invariability and band limiting, which are needed for conventional sampling theorems, are not needed, and it suffices that the region of the object space is limited in order to make the integration of only formula (1) possible.

However, when considering that the conditions of region limitation naturally have limits in the visual field of the imaging optical system, there are no problems in practice. Moreover, the important point is that, in accordance with formulas (1) and (2), the sampling is defined commonly for uniform intervals and for non-uniform intervals. Further, the characteristics of the imaging system can be evaluated by the SVD eigenvalue spectra $\gamma_i^2$ i=1, 2, . . . , R of the continuous-to-discrete observation operator H{ }.

Namely, as can be understood from formulas (6) and (7), in order to carry out image restoration by utilizing the observed discrete values as effectively as possible, it is preferable that the rank R is as close as possible to the number N of observation pixels and that all of the SVD eigenvalues of the rank R or less are as uniform values as possible.

Figure 4:
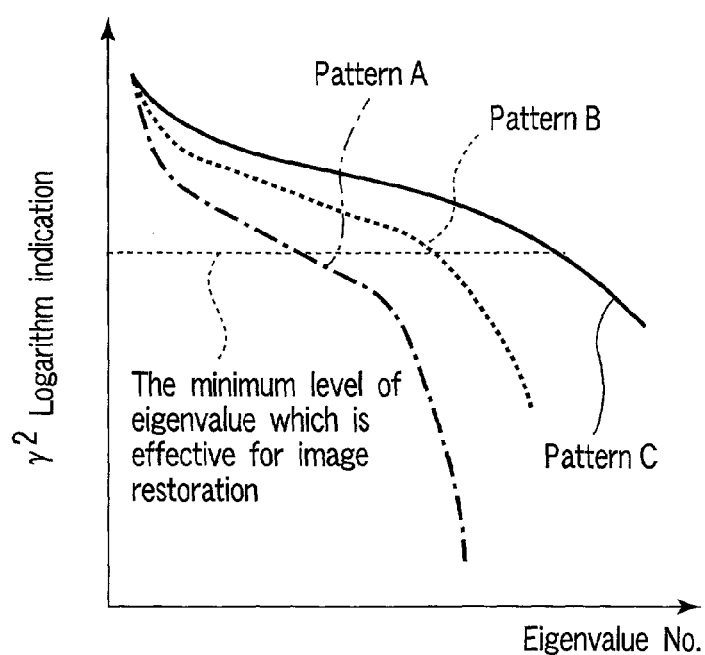
FIG. 4 is a graph for explaining which pixel arrangement is the most easy to be restored among the three types of imaging pixel arrangements of pattern A, pattern B, and pattern C.

Explanatory diagrams thereof are shown in FIG. 3 and FIG. 4. FIG. 3 is a graph for explaining which pixel arrangement has the most effective imaging among the three types of imaging pixel arrangements of pattern 1, pattern 2, and pattern 3. FIG. 4 is a graph for explaining which pixel arrangement is the most easy to be restored among the three types of imaging pixel arrangements of pattern A, pattern B, and pattern C.

FIG. 3 is a diagram in which the imaging pixel arrangement has three patterns of pattern 1, pattern 2 and pattern 3, and compares the SVD eigenvalue spectra of the respective continuous-to-discrete observation operators H{ } when supposing a case where the number of imaging pixels is effectively reduced in accordance with moving from pattern 1 to pattern 3. When the minimum level (the number of eigenvalues exceeding this value may be defined as the substantial rank R) of effective eigenvalues for image restoration is set, the number of eigenvalues of this minimum level or more, i.e., the number of effective eigenvalues, hardly varies regardless of the total number of eigenvalues decreasing due to the number of pixels being decreased. In the imaging pixel arrangement of pattern 3 satisfying this condition, it can be thought that the rank R is close to the number N of observation pixels and that the number of imaging pixels is effectively reduced.

Further, FIG. 4 assumes the case of three types of patterns of pattern A, pattern B and pattern C having the same number of imaging pixels and different pixel arrangements. At the eigenvalue spectra thereof, the difference in eigenvalues becomes smaller in accordance with moving from pattern A to pattern C. Accordingly, among the patterns, in pattern C, all of the SVD eigenvalues of the rank R or less are as uniform as possible, which is advantageous for image restoration.

We now consider a case where such conditions are achieved. The SVD eigenvalues of the continuous-to-discrete observation operator H{ } are determined as eigenvalues of the characteristic matrix $HH^t\{$ $\}$. Thus, the properties of the eigenvalue spectra depend on what type of value distribution the elements of this characteristic matrix $HH^t\{$ $\}$ have. When the characteristic matrix $HH^t\{$ $\}$ is a unit matrix, ultimately, the inverse matrix thereof also is a unit matrix, and the most preferable condition is obtained. In order to achieve a condition close to this, it suffices for the non-diagonal components at the characteristic matrix $HH^t\{$ $\}$ to be as small as possible as compared with the diagonal components.

Here, when the elements of the characteristic matrix $HH^t\{$ $\}$ are considered, the element $a_{ij}$ of the address (i,j) is expressed by the following formula:

$$a_{ij} = \int_A h_i(r) h_j(r) dr \quad (9)$$

where r is a vector. As known from the above formula (9), the element $a_{ij}$ of the characteristic matrix $HH^t\{$ $\}$ is a value in which the overlapped region of the sensitivity distribution function $h_i(r)$ for the ith imaging pixel and the sensitivity distribution function $h_j(r)$ for the jth imaging pixel, is integrated. Accordingly, in order for a non-diagonal component of the characteristic matrix $HH^t\{$ $\}$ to be a small value, it suffices that, in the element $a_{ij}$, i and j are as small as possible when i and j are not equal. In other words, it suffices that a condition, in which the sensitivity distribution functions between adjacent pixels do not overlap in an object space as much as possible, is determined. FIGS. 5A and 5B show two examples in which sensitivity distribution functions of adjacent pixels overlap in an object space.

Here, in the present embodiment, it is considered that arrangement of the imaging pixels is set such that the overlapping of the sensitivity distribution functions of adjacent pixels is small, and such that there is the condition that the integral values of the overlapping are close to equal in the imaging surface. As a concrete example, the following method is proposed.

(i) An appropriate sampling interval is determined on the basis of the sampling theorem in the central region of the imaging surface. Focusing on the central portion, the spatial transfer characteristics are usually regarded as the best and as shift-invariant. The spatial frequency band of the imaging optical system in the central portion is determined, and firstly, a sampling interval in the region is determined.

(ii) Next, an integral value in the overlapped region of the sensitivity distribution functions for adjacent imaging pixels in the central portion is determined.

(iii) Because the sensitivity distribution function widens spatially in accordance with moving toward the peripheral portion of the imaging surface, the interval between adjacent imaging pixels is widened such that the integral value of the overlapped region of the sensitivity distribution functions for adjacent imaging pixels is close to the value determined in (ii).

In accordance with the above-described method, a pixel arrangement example of the CMOS imaging element 211 in which the density seamlessly decreases in accordance with moving from the center to the peripheral portion of the imaging surface, is shown in FIG. 5C.

Further, another example is shown in FIG. 6. The imaging surface of the CMOS imaging element 212 is divided into four regions in a concentric circle form as shown in the left-hand figure, and the densities of the pixels are different at each region. Namely, as shown in the right-hand figure, although the density of the pixel arrangement decreases in accordance with moving from the center to the periphery of the imaging surface, the pixels are arranged to be uniform in each region.

A method of changing the density of the pixel arrangement is realized by thinning in accordance with a rule. For example, the imaging pixels are arranged on all of the lattice points in region 1, and the pixels are thinned in a staggered form at every other point in region 2, and two adjacent points are in series thinned in region 3. While adopting such a method, a structure of pixel arrangements which approximately satisfies the conditions of FIGS. 5A, 5B and 5C is realized.

Next, the method of restoring an image sampled in a square lattice form, by using a discrete image signal inputted by non-uniform interval sampling of 2. is proposed. As shown in formula (8), in accordance with the present principles, image restoration processing is realized by linear computation in a discrete system. This means that, even if the imaging pixel arrangements are non-uniform intervals, a generalizing method of deriving the desired display pixels from the observed values in accordance therewith is defined.

However, if an attempt is made to directly calculate formula (8), a vast amount of calculation is needed. For example, even in a case of a relatively small image acquisition/output system in which the imaging elements are 20,000 pixels and are outputted to a display system having 100,000 pixels, although the size of the restoration matrix B is a size of a 100,000×20,000, it is difficult in practice to implement the inner product computation of such a giant matrix and observed vectors. Thus, on the basis of the concepts described below, a method which decreases the amount of computation is proposed.

Considering formula (8), inner product computation of the observed vector g formed from all of the observed pixel values and the row vector of matrix B is executed in order to restore an arbitrary display pixel. Accordingly, when the number of imaging pixels is 20,000 pixels, the inner product of the 20,000 dimensional vectors is calculated in order to determine one display pixel. However, in order to determine a display pixel, the effects of an observed value by imaging pixels whose positions are far away should be small.

Here, even if an attempt is made to carry out restoration processing by considering only the observed values by limited imaging pixels in the vicinity of positions of the corresponding display pixels, it can be thought that there are no problems in practice. Thus, a method of restoration processing in accordance with the following method is proposed.

(i) First, in accordance with the previously-described principles of image restoration in a continuous-to-discrete system, the restoration matrix B of formula (8) is determined. Then, the method proceeds to (ii) or (ii').

(ii) Each line vector of the restoration matrix B is analyzed, and elements whose values are equal to or less than a given threshold value are excluded from computation. Namely, the value is forcibly made to be 0.

(ii') A vicinity range of the position corresponding to the display pixel is defined, and the observed values by the imaging pixels included in this range are made to be the objects of computation. This range may be unchanged, or may be changed, in accordance with the position of the display pixel.

In accordance with the above-described method, the restoration matrix B of formula (8) is newly defined as a restoration matrix B' in which the substantial number of elements is reduced, as follows.

$$f^c = B'g = \begin{bmatrix} jdpeyxk0 \cdots\cdots\cdots\cdots\cdots\cdots 0 \\ \cdots\cdots \\ 0\cdots\cdots 0gnajoyhioe0\cdots\cdots 0 \\ \cdots\cdots \\ 0\cdots\cdots\cdots\cdots\cdots\cdots 0fsdhrus \end{bmatrix} g \quad (10)$$

In above formula (10), the elements whose value is 0 can be excluded from computation. Thus, it suffices to record only the other elements.

Figure 7:
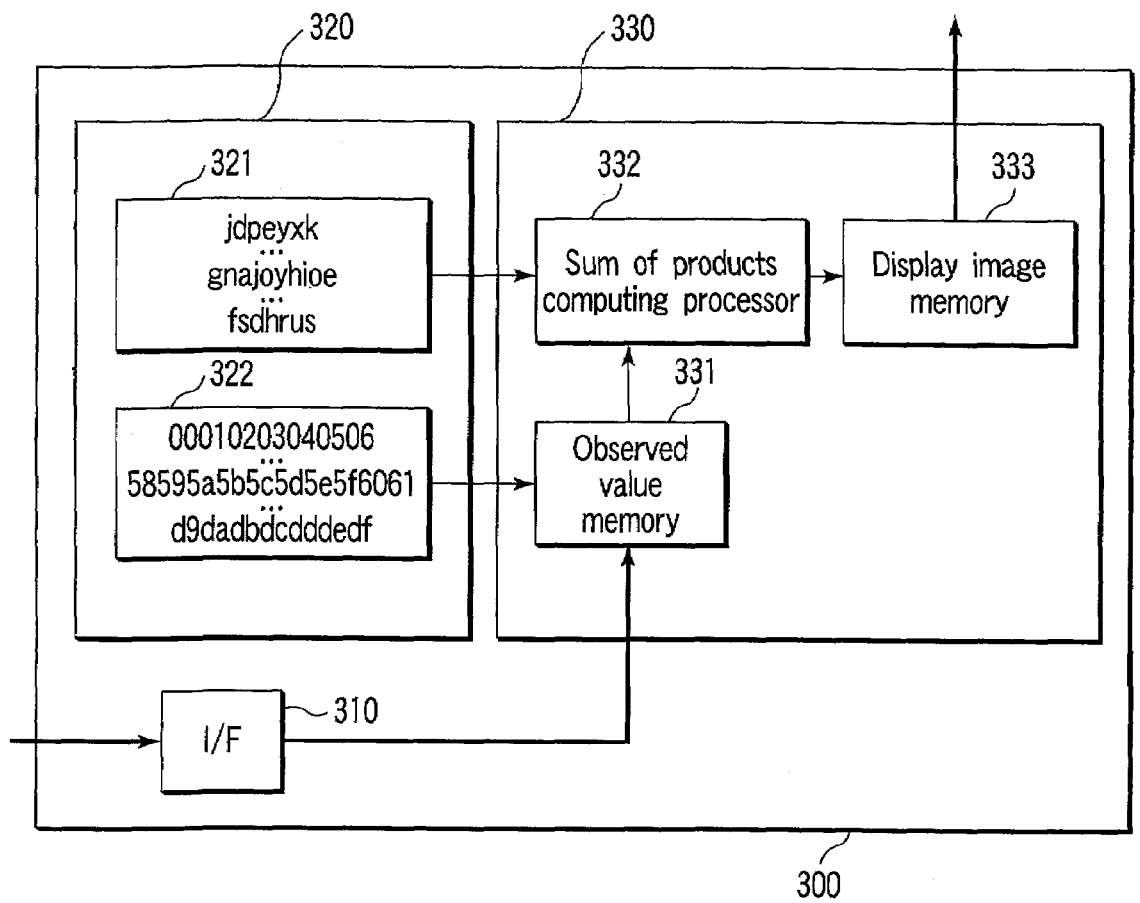
FIG. 7 is a diagram showing a structure of an image restoration processor 300 which embodies a method of the present embodiment.

The structure of the image restoration processor 300 embodying the above-described method is shown in FIG. 7. A matrix element memory 321 and an address memory 322 are built-in in the coefficient memory 320. Coefficients other than the 0 elements in restoration matrix B' of formula (10) are recorded in the matrix element memory 321. Addresses, showing to which imaging pixel observed value each coefficient recorded in the matrix element memory 321 corresponds, are recorded in the address memory 322. An observed value memory 331, a sum of products computation processor 332 and a display image memory 333 are built-in in the image restoration processing circuit 330. A digital signal inputted via an I/F 310 is once recorded in the observed value memory 331.

Both a predetermined observed value called up from the observed value memory 331 in accordance with the address value recorded in the address memory 332, and the corresponding matrix element recorded in the matrix element memory 321, are inputted to the sum of products computation processor 332. Inner product computation between vectors is carried out, and the results are recorded in the display image memory 333 as a value corresponding to one display pixel. The display image is structured in this way.

In accordance with the above-described first embodiment, on the basis of the principles of image restoration defined for a continuous-to-discrete system, an imaging pixel arrangement, for carrying out image acquisition effectively for an arbitrary imaging optical system, is provided. In particular, with this arrangement, selection with a large number of degrees of freedom, including non-uniform interval sampling, is possible. Therefore, an imaging element, which inputs the minimum observed values without waste and which is useful for reducing the transfer data, can be provided. With this method, because the data inputted from the start can be limited, a circuit such as an encoder needed for a digital compression method is unnecessary. Further, a method of restoring a desired display image from observed values inputted from an arbitrary imaging pixel arrangement is defined, and can be realized by a digital computation processing having a small amount of computation.

In this way, in accordance with the first embodiment, by totally designing by combining the imaging optical system and the imaging element and the digital image restoration processing, a structure of an imaging section under strict constraints can be realized, and an image acquisition apparatus useful in practice can be provided.

(Second Embodiment)

Figure 8:
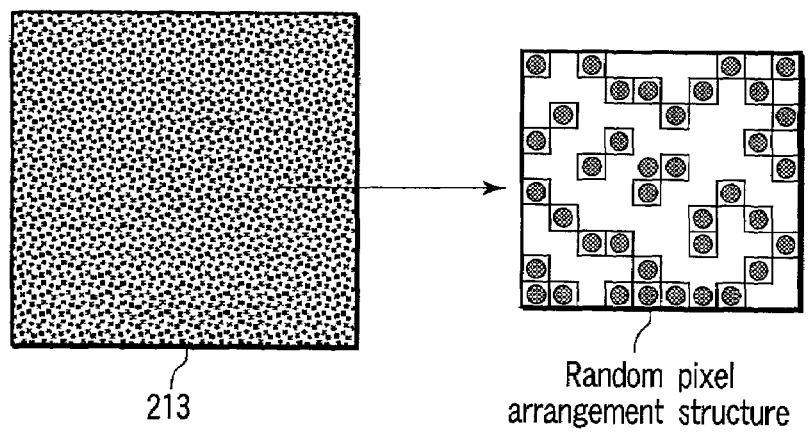
FIG. 8 is a diagram showing a concrete example of an imaging pixel arrangement in an imaging element according to a second embodiment of the present invention.

A second embodiment of the present invention is a modified example of the imaging pixel arrangement in the imaging element. FIG. 8 shows a structural example of the second embodiment. Imaging pixels are disposed randomly throughout an entire imaging surface of a CMOS imaging element 213. Here, the definition of random is that the following two conditions are satisfied simultaneously.

(i) There is no regularity to the distribution of the intervals between adjacent pixels.

(ii) The existence concentration within a local region having a predetermined surface area is uniform and does not depend on the position of that local region.

Figure 9:
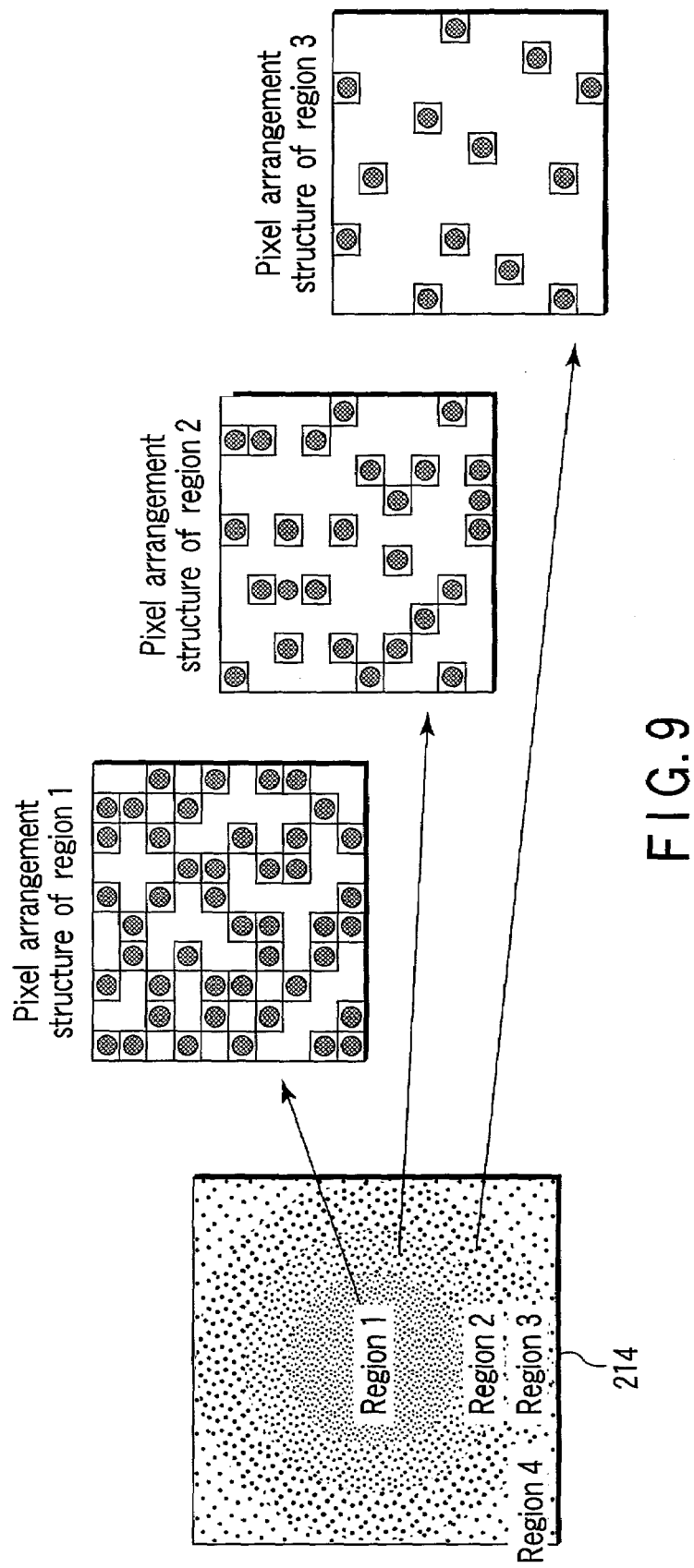
FIG. 9 is a diagram showing another structural example of an imaging pixel arrangement in the imaging element according to the second embodiment of the present invention.

FIG. 9 shows another structural example. The imaging surface of the imaging element is divided into four regions (region 1 through region 4) in a concentric circle form as shown in the left-hand drawing. In the same way as FIG. 6, for each region, the concentration of the pixels greatly differs. Within each region, the concentration is uniform, but the pixels are disposed randomly. Namely, the structure of FIG. 9 shows an imaging pixel arrangement in which the structures of FIG. 6 and FIG. 8 are combined. Other structures are similar to those of the first embodiment.

As described above, the second embodiment shows an example of an imaging element in which the pixel arrangement is random. The effectiveness thereof can be explained as follows. In an image acquisition system of strict conditions such that the number of observations is limited to be extremely small, it is known that making the imaging pixel arrangement random can obtain conditions preferable to image restoration. This is disclosed in, for example, the reference document "W. E. Smith, and H. H. Barrett, Hotelling trace criterion as a figure of merit for the optimization of imaging systems, J. Opt, Soc. Am. (A), Vol. 3, pp. 717–725 (1986)". Here, in the second embodiment, by thinning the pixels unsystematically when the pixel arrangement such as that shown in the first embodiment is to be further reduced, conditions which work more advantageously for image restoration processing can be obtained.

On the basis of such principles, a random pixel arrangement is realized in FIG. 8. Further, FIG. 9 shows an example which, while following on the pixel arrangement of the first embodiment handling dispersion in the spatial transfer characteristics within the imaging surface, adds unsystematic thinning in order to further reduce the pixels.

In accordance with the above-described second embodiment, observation by even fewer imaging pixels is possible while keeping the deterioration of the restored image to a minimum. Accordingly, a structure of an imaging section under strict constraints can be realized, and an image acquisition apparatus useful in practice can be provided.

(Third Embodiment)

Figure 10:
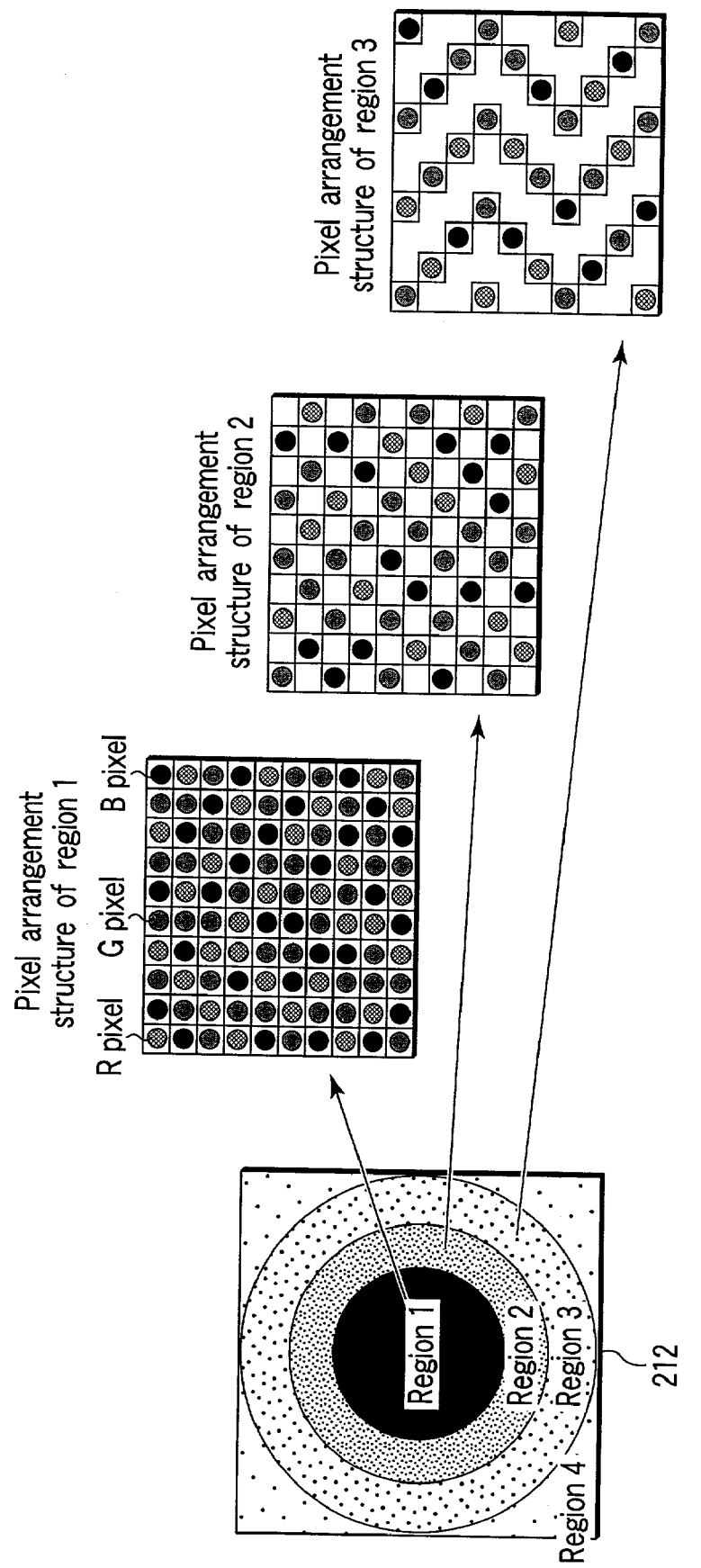
FIG. 10 is a diagram showing a structural example of an imaging element according to a third embodiment of the present invention.

The third embodiment of the present invention is an example in which imaging elements are structured by mosaic color type elements. FIG. 10 shows a structural example of the third embodiment. In the same way as FIG. 6 of the first embodiment, the imaging surface of a CMOS imaging element 215 is divided into four regions (region 1 through region 4) in a concentric circle form, and in accordance with moving from the center toward the periphery of the imaging surface, the concentration of disposed pixels becomes smaller region-by-region. Further, the pixel arrangement in each region is realized by systematic thinning. In this pixel arrangement structure, in order to realize a color imaging element, the arrangement of color filters mounted to the light receiving surface of each imaging pixel is random. Namely, when a method is used in which a color image is picked up by filters of the three primary colors of red (R), green (G), and blue (B), the arrangement for each pixel to which the respective primary color filters are mounted is set to be random.

The processing of a discrete system is realized by a structure which is similar to that of the first embodiment for each primary color image signal. The three primary color images are ultimately generated and displayed. Accordingly, the structure of the discrete processing system is fundamentally similar to that of the first embodiment, and illustration thereof is omitted.

The third embodiment provides an example of structuring a color imaging element by utilizing both the pixel arrangement of the first embodiment handling the dispersion in the spatial transfer characteristics within the imaging surface, and the method of the second embodiment of adding unsystematic thinning in order to effectively reduce the pixels.

In accordance with the above-described third embodiment, when structuring a mosaic color imaging element, ideally, the places where three times the number of imaging pixels is needed can be structured by a limited number of pixels. By combining this with the pixel restoration processing by a discrete system, a color image having a desired image quality can be generated. Accordingly, a structure of an imaging section for picking up a color image under strict constraints can be realized, and an image acquisition apparatus useful in practice can be provided.

(Fourth Embodiment)

The fourth embodiment of the present invention relates to a system structure for setting conditions adaptively to a lens, an imaging section, and an image restoration processor. As the method of concretely realizing the pixel arrangement of the imaging element such as those of the first through third embodiments, the imaging pixels may be prepared from the start for only a predetermined position in a semiconductor manufacturing process. Or, in a semiconductor manufacturing process, the imaging pixels may be prepared densely in accordance with a predetermined lattice arrangement, and programming control may be carried out so as to access only predetermined imaging pixels when reading out the charges. The fourth embodiment is a concrete example of the latter.

FIG. 11 is a diagram showing the structure of an image acquisition apparatus according to the fourth embodiment of the present invention. A lens 100 and an imaging section 200 are removable via a lens adapter 201 provided in the imaging section 200, and are structured such that different lenses 100 can be mounted in accordance with the application. A code memory 101 structured from ROM or the like is provided at the lens 100, and a code which expresses the type of the lens 100 is recorded in the code memory 101.

When the lens 100 is mounted to the imaging section 200, the code memory 101 and a code memory adapter 202 provided at the imaging section 200 are automatically connected, and the code, which expresses the type of the lens 100 and is recorded in the code memory 101, is transferred to a CMOS driver 230 in the imaging section 200. An address memory 240 is built-in in the imaging section 200. An address expressing the optimal imaging pixel arrangement is recorded in the address memory 240 in accordance with the type of the lens 100.

The CMOS driver 230 reads out the corresponding imaging pixel address from the address memory 240 on the basis of the code expressing the type of the lens 100, and carries out access control with respect to a CMOS imaging element 210. The CMOS imaging element 210 is structured from a large number of imaging pixels arranged in square lattice form, and charges corresponding to the light intensity of the image imaged on the imaging surface are accumulated in each pixel.

Only the pixels corresponding to a predetermined imaging pixel address specified from those imaging pixels are selected by control by the CMOS driver 230, and the charges are read out therefrom. The charges read out in this way are converted to predetermined image signals by the image signal output circuit 220 and are outputted.

Further, the code of the lens type recorded in the code memory 101 of the lens 100 is sent to the image signal output circuit 220 by the CMOS driver 230, and the code of the lens type is, in addition to the image signal, outputted at the image signal output circuit 220. At the image restoration processor 300, the lens type code and the image signal which are sent from the imaging section 200 are inputted, and, by an interface 311, the code is transferred to the coefficient memory 321 and the image signal is transferred to an image restoration processing circuit 330. Further, an appropriate coefficient is sent to the image restoration processing circuit 330 from the coefficient memory 321 in accordance with the lens type, and a predetermined computation processing is executed between the coefficient and the image signal, and the final display image is generated.

In accordance with the fourth embodiment described above, when a lens is switched, the appropriate conditions of the imaging pixel arrangement and the image restoration processing are automatically set adaptively. Accordingly, systematization, such as customizing an apparatus in accordance with the application, is possible, and a highly general-purpose and actually useful image acquisition apparatus can be provided.

(Supplementary Notes)

Note that, the present invention having the following structures can be extracted from the above-described concrete embodiments.

1. An image acquisition apparatus comprising:
an imaging optical system;
an imaging section which has a plurality of imaging pixels disposed at non-uniform intervals within an imaging surface, and picks up an object image imaged by the imaging optical system to convert the object image into image signals; and
an image restoration processing section which has a coefficient memory in which a predetermined coefficient sequence is recorded, and an image restoration processing circuit which carries out computation processing between the coefficient sequence recorded in the coefficient memory and the image signals from the imaging section, the image restoration processing section generating an image in a desired display pixel arrangement.

The above-described structure corresponds to at least FIG. 1 of the "Embodiments of the Invention".

1-1. An image acquisition apparatus according to item 1, wherein an interval between adjacent pixels of the plurality of imaging pixels is set based on the fact that a spatial transfer characteristic of the imaging optical system differs in accordance with a position within the imaging surface.

The above-described structure corresponds to at least FIGS. 5A, 5B and 5C of the "Embodiments of the Invention".

1-1-1. An image acquisition apparatus according to item 1-1, wherein the imaging optical system has a circular opening, and an arrangement of the plurality of imaging pixels is such that the interval between adjacent pixels varies in accordance with moving from a center of an optical axis of the imaging optical system toward a peripheral portion within the imaging surface.

The above-described structure corresponds to at least FIGS. 5A, 5B AND 5C of the "Embodiments of the Invention".

1-1-2. An image acquisition apparatus according to item 1-1, wherein an arrangement of the plurality of imaging pixels is such that the interval between adjacent pixels is set such that integral values, in a region in which sensitivity distribution functions corresponding to adjacent imaging pixels overlap one another, are substantially uniform within the imaging surface.

Here, the sensitivity distribution function is defined for each of the plurality of imaging pixels forming the imaging element, and expresses the light intensity distribution on the object space inputted at the imaging pixel. For example, the sensitivity distribution function for the kth imaging pixel is denoted as $h_k(r)$ (r is a vector).

Further, the integral value of the region where the sensitivity distribution functions corresponding to the adjacent imaging pixels overlap one another is expressed by following formula $a_{ij}$, when the sensitivity distribution functions for the adjacent ith and jth imaging pixels are denoted as $h_i(r)$, $h_j(r)$ (r is a vector) respectively. S is the integral range corresponding to the region of overlapping.

$$a_{ij} = \int_S h_i(r) h_j(r) dr$$

The above-described structure corresponds to at least FIGS. 5A, 5B AND 5C of the "Embodiments of the Invention".

1-1-3. An image acquisition apparatus according to item 1-1, wherein an imaging pixel arrangement is set in accordance with the sampling theorem for a region in which a spatial transfer characteristic of the imaging optical system in a central portion of the imaging surface is substantially uniform.

The above-described structure corresponds to at least FIGS. 5A, 5B AND 5C of the "Embodiments of the Invention".

1-2. An image acquisition apparatus according to item 1, wherein an arrangement of the plurality of imaging pixels is set such that, for a continuous-to-discrete observation operator which relates the imaging optical system and the imaging section, a rank is as near as possible to a number of imaging pixels, and all SVD (Singular Value Decomposition) eigenvalues of the rank or less are as uniform values as possible.

Here, the continuous-to-discrete observation operator is, in the broader meaning, a matrix which is discrete in the column direction and continuous (an infinite number of elements exists) in the row direction, due to the sensitivity distribution functions being arranged in the row direction. This operator can be expressed by the following formula when the number of imaging pixels is N.

$$H\{\ \} = [h_1(r) h_2(r) \ldots h_N(r)]^t (r \text{ is a vector})$$

The continuous-to-discrete observation operator H{ } can be SVD (Singular Value Decomposition) converted by the following formula in the same way as the matrix:

$$HH^t\{\ \} = V T^2 V^t$$

wherein $V = [v_1\ v_2\ \ldots\ v_N]$.

V is an SVD eigenmatrix, and is formed by the N-dimensional SVD eigenvectors $v_i$ i=1, 2, . . . , N.

$$\Gamma^2 = \begin{bmatrix} \gamma_1^2 & & & \\ & \gamma_2^2 & & \\ & & \cdots & \\ & & & \gamma_N^2 \end{bmatrix}$$

$\Gamma^2$ is an SVD eigenvalue matrix, and is structured by N SVD eigenvalues $\gamma_i^2$ i=1, 2, . . . , N being aligned at the diagonal components.

The rank is the number of SVD eigenvalues greater than a predetermined threshold value defined such that the SVD eigenvalues are 0 or effectively sufficiently small. Further, all of the SVD eigenvalues of the rank or less means all of the SVD eigenvalues whose order is the value of the rank or less when the SVD eigenvalues are aligned in descending order, i.e., all of the SVD eigenvalues which are greater than the predetermined threshold value defined as 0 or effectively sufficiently small.

The above-described structure corresponds to at least FIG. 3 and FIG. 4 of the "Embodiments of the Invention".

1-3. An image acquisition apparatus according to item 1, wherein an interval between adjacent pixels of the plurality of imaging pixels is set randomly.

Here, the definition of random satisfies the next two conditions simultaneously.

(i) The distribution of the intervals of adjacent pixels has no regularity.

(ii) The existence density in a local region having a predetermined surface area is equal regardless of the position of the local region.

The above-described structure corresponds to at least FIG. 8 of the "Embodiments of the Invention".

1-4. An image acquisition apparatus according to item 1-2, wherein an interval between adjacent pixels of the plurality of imaging pixels is set so as to be uniform in each divisional region when the imaging surface is divided into local regions where a spatial transfer characteristic of the imaging optical system is substantially uniform.

Here, uniformity means that existence density in a local region having a predetermined surface area is equal regardless of the position of the local region.

The above-described structure corresponds to at least FIG. 6 of the "Embodiments of the Invention".

1-4-1. An image acquisition apparatus according to item 1-4, wherein in each divisional region, the interval between adjacent pixels is set systematically.

The above-described structure corresponds to at least FIG. 6 of the "Embodiments of the Invention".

1-4-2. An image acquisition apparatus according to item 1-4, wherein in each divisional region, the interval between adjacent pixels is set randomly.

The above-described structure corresponds to at least FIG. 9 of the "Embodiments of the Invention".

1-5. An image acquisition apparatus according to item 1, wherein the imaging element is a mosaic color-type imaging element.

The above-described structure corresponds to at least FIG. 10 of the "Embodiments of the Invention".

1-5-1. An image acquisition apparatus according to item 1-5, wherein an arrangement of a plurality of imaging pixels to which same color filters are mounted is such that an interval between adjacent pixels is set randomly.

The above-described structure corresponds to at least FIG. 10 of the "Embodiments of the Invention".

1-6. An image acquisition apparatus according to item 1, wherein the coefficient memory is structured by a matrix element memory and an address memory, and the image restoration processing circuit is structured by an observed value memory and a sum of products computation processor and a display image memory.

The above-described structure corresponds to at least FIG. 7 of the "Embodiments of the Invention".

1-6-1. An image acquisition apparatus according to item 1-6, wherein a coefficient sequence recorded in the matrix element memory includes coefficients corresponding to x imaging pixels which are objects of computation when one predetermined display pixel is restored, and a coefficient sequence recorded in the address memory includes coefficients expressing addresses of these x imaging pixels, and the sum of products computation processor executes sum of products computation between observed values and the coefficients corresponding to these x imaging pixels when the one display pixel is restored, and coefficient sequences corresponding to all of the display pixels are recorded in the matrix element memory and the address memory.

The above-described structure corresponds to at least FIG. 7 of the "Embodiments of the Invention".

1-6-1-1. An image acquisition apparatus according to item 1-6-1, wherein a value of x of the x imaging pixels, which are objects of computation when the predetermined one display pixel is restored, changes in accordance with the display pixel.

The above-described structure corresponds to at least FIG. 7 of the "Embodiments of the Invention".

1-6-1-2. An image acquisition apparatus according to item 1-6-1, wherein a coefficient sequence recorded in the matrix element memory is a coefficient sequence which is determined by extracting elements necessary for restoration of a discrete image with respect to a discrete-to-continuous pseudo-inverse matrix operator defined for a continuous-to-discrete observation operator, a continuous-to-discrete resampling operator discretizing a continuous image virtually restored by operating the discrete-to-continuous pseudo-inverse matrix operator with respect to a discrete observation vector, and one restoration matrix formed by linearly joining the discrete-to-continuous pseudo-inverse matrix operator and the continuous-to-discrete resampling operator, and a coefficient sequence recorded in the address memory is a coefficient sequence expressing an address of an imaging pixel corresponding to an extracted coefficient when a necessary element is extracted from the restoration matrix.

The above-described structure corresponds to at least FIG. 7 of the "Embodiments of the Invention".

The discrete-to-continuous pseudo-inverse matrix operator defined for the continuous-to-discrete observation operator is defined as follows. When the continuous-to-discrete observation operator H{ } is interpreted as a matrix in the broader sense, the characteristic matrix $HH^t${ }, which is the matrix product with its own transposed operator $H^t${ }, is a completely discrete matrix of N×N elements. This pseudo-inverse matrix $(HH^t)^-${ } is defined as follows:

$$(HH^t)^-\{\ \} = V(\Gamma^2)^{-1}V^t$$

wherein $$(\Gamma^2)^{-1} = \begin{bmatrix} 1/\gamma_1^2 & & & \\ & 1/\gamma_2^2 & & \\ & & \ldots & \\ & & & 1/\gamma_N^2 \end{bmatrix}$$

The discrete-to-continuous pseudo-inverse matrix operator $H^t\{(HH^t)^-\{\ \}\}$ is defined by linearly joining the pseudo-inverse matrix $(HH^t)^-\{\ \}$ and the discrete continuous transposition operator $H^t\{\ \}$.

Further, the continuous-to-discrete resampling operator, which discretizes a continuous image virtually restored by operating the discrete-to-continuous pseudo-inverse matrix operator with respect to the discrete observation vector, is defined as follows. The discrete observation vector is a vector having as elements the observation values by N imaging pixels, and is denoted as $$g = [g_1\ g_2\ \ldots\ g_N]^t.$$

The continuous image $f^c(r)$ (r is a vector) virtually restored is determined by operating the discrete-to-continuous pseudo-inverse matrix operator $H^t\{(HH^t)^-\{\ \}\}$ with respect to the discrete observation vector g. This process is denoted by $$f^c(r) = H^t\{(HH^t)^-\{g\}\}$$

The continuous-to-discrete resampling operator $S\{\ \}$ is an operator for converting the restored continuous image $f^c(r)$ into the discrete restored image vector $f^c$ structured by M pixels. The process thereof is denoted by $$f^c = S\{f^c(r)\}.$$

One restoration matrix, which is formed by linearly combining the discrete-to-continuous pseudo-inverse matrix operator and the continuous-to-discrete resampling operator, is defined as follows. The continuous restored image $f^c(r)$ is determined by operating the discrete-to-continuous pseudo-inverse matrix operator $H^t\{(HH^t)^-\{\ \}\}$ with respect to the discrete observation vector g as described above. Further, the discrete restored image $f^c$ is derived by operating the continuous-to-discrete resampling operator $S\{\ \}$ on the restored continuous image $f^c(r)$. However, because such restoration processings are all carried out in a discrete system, the process of determining the discrete restored image $f^c$ from the observation vector g ultimately results in a linear process in a discrete system such as follows.

$$f^c = Bg = S\{f^c(r)\} = S\{H^t\{(HH^t)^-\{g\}\}\}$$

The M×N restoration matrix B is defined by the formula.

The above-described structure corresponds to at least FIG. 7 of the "Embodiments of the Invention".

1-6-1-2-1. An image acquisition apparatus according to item 1-6-1-2, wherein operation for extracting the necessary element from the restoration matrix is realized by extracting an element whose value is greater than or equal to a predetermined threshold value.

The above-described structure corresponds to at least FIG. 7 of the "Embodiments of the Invention".

1-6-1-2-2. An image acquisition apparatus according to item 1-6-1-2, wherein operation for extracting the necessary element from the restoration matrix is realized by defining a neighboring range of a position corresponding to the display pixel.

The above-described structure corresponds to at least FIG. 7 of the "Embodiments of the Invention".

1-7. An image acquisition apparatus comprising:

an imaging optical system selected from a plurality of types of imaging optical systems;

an imaging section which has a plurality of imaging pixels disposed at uniform intervals in an imaging surface, and picks up an object image imaged by the imaging optical system and converting the object image into image signals;

a specifying section which specifies an imaging pixel corresponding to a type of a selected imaging optical system; and an image restoration processing section which has a coefficient memory in which a predetermined coefficient sequence is recorded, and an image restoration processing circuit which reads out a coefficient sequence corresponding to the type of the selected imaging optical system from the coefficient memory and carries out computation processing between the read-out coefficient sequence and the image signal from the imaging section, the image restoration processing section generating an image in a desired image display pixel arrangement.

The above-described structure corresponds to at least FIG. 11 of the "Embodiments of the Invention".

1-7-1. An image acquisition apparatus according to item 1-7, wherein the imaging optical system has a memory in which information of the type of the imaging optical system is recorded.

The above-described structure corresponds to at least FIG. 11 of the "Embodiments of the Invention".

1-7-2. An image acquisition apparatus according to item 1-7, wherein the imaging section is configured such that, by accessing only imaging pixels specified when reading charges from the imaging element, an imaging pixel arrangement suited for the type of the imaging optical system can be realized.

The above-described structure corresponds to at least FIG. 11 of the "Embodiments of the Invention".

1-7-2-1. An image acquisition apparatus according to item 1-7-2, wherein the imaging section has a memory in which is recorded imaging pixel address data of a plurality of types suited to a plurality of imaging optical systems, and by reading-out therefrom one type of imaging pixel address data corresponding to the imaging optical system actually used, only imaging pixels specified when reading charges from the imaging element are accessed.

The above-described structure corresponds to at least FIG. 11 of the "Embodiments of the Invention".

1-7-3. An image acquisition apparatus according to item 1-7, wherein the coefficient memory records a plurality of types of coefficient sequences suited for a plurality of imaging optical systems, and by reading-out therefrom one type of coefficient sequence corresponding to the imaging optical system actually used, computation processing is carried out by using a coefficient sequence suited to the type of the imaging optical system.

The above-described structure corresponds to at least FIG. 11 of the "Embodiments of the Invention".

In accordance with the present invention, by totally relating the imaging optical system and the imaging element arrangement and the restoration processing, it is possible to provide an image acquisition apparatus which improves the degrees of freedom in design of the imaging section under strict constraints, and which is useful in practice even under conditions in which the space for setting the imaging section and the signal transfer band from the imaging section are strictly limited.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image acquisition apparatus comprising:
   an imaging optical system;
   an imaging section which has a plurality of imaging pixels disposed at non-uniform intervals within an imaging surface, and picks up an object image imaged by the imaging optical system to convert the object image into image signals; and
   an image restoration processing section which has a coefficient memory in which a predetermined coefficient sequence is recorded, and an image restoration processing circuit which carries out computation processing between the coefficient sequence recorded in the coefficient memory and the image signals from the imaging section, said image restoration processing section generating an image in a desired display pixel arrangement,
   wherein an interval between adjacent pixels of the plurality of imaging pixels is set based on the fact that a spatial transfer characteristic of the imaging optical system differs in accordance with a position within the imaging surface, and
   wherein an arrangement of the plurality of imaging pixels is such that the interval between adjacent pixels is set such that integral values, in a region in which sensitivity distribution functions corresponding to adjacent imaging pixels overlap one another, are substantially uniform within the imaging surface.

2. An image acquisition apparatus comprising:
   an imaging optical system;
   an imaging section which has a plurality of imaging pixels disposed at non-uniform intervals within an imaging surface, and picks up an object image imaged by the imaging optical system to convert the object image into image signals; and
   an image restoration processing section which has a coefficient memory in which a predetermined coefficient sequence is recorded, and an image restoration processing circuit which carries out computation processing between the coefficient sequence recorded in the coefficient memory and the image signals from the imaging section, said image restoration processing section generating an image in a desired display pixel arrangement,
   wherein an arrangement of the plurality of imaging pixels is set such that, for a continuous-to-discrete observation operator which relates the imaging optical system and the imaging section, a rank is as near as possible to a number of imaging pixels, and all SVD (Singular Value Decomposition) eigenvalues of the rank or less are as uniform values as possible.

3. An image acquisition apparatus according to claim 2, wherein an interval between adjacent pixels of the plurality of imaging pixels is set so as to be uniform in each divisional region when the imaging surface is divided into local regions where a spatial transfer characteristic of the imaging optical system is substantially uniform.

4. An image acquisition apparatus according to claim 3, wherein in each divisional region, the interval between adjacent pixels is set systematically.

5. An image acquisition apparatus according to claim 3, wherein in each divisional region, the interval between adjacent pixels is set randomly.

6. An image acquisition apparatus comprising:
   an imaging optical system;
   an imaging section which has a plurality of imaging pixels disposed at non-uniform intervals within an imaging surface, and picks up an object image imaged by the imaging optical system to convert the object image into image signals; and
   an image restoration processing section which has a coefficient memory in which a predetermined coefficient sequence is recorded, and an image restoration processing circuit which carries out computation processing between the coefficient sequence recorded in the coefficient memory and the image signals from the imaging section, said image restoration processing section generating an image in a desired display pixel arrangement,
   wherein the coefficient memory is configured by a matrix element memory and an address memory, and the image restoration processing circuit is structured by an observed value memory and a sum of products computation processor and a display image memory.

7. An image acquisition apparatus according to claim 6, wherein an interval between adjacent pixels of the plurality of imaging pixels is set based on the fact that a spatial transfer characteristic of the imaging optical system differs in accordance with a position within the imaging surface.

8. An image acquisition apparatus according to claim 7, wherein the imaging optical system has a circular opening, and an arrangement of the plurality of imaging pixels is such that the interval between adjacent pixels varies in accordance with moving from a center of an optical axis of the imaging optical system toward a peripheral portion within the imaging surface.

9. An image acquisition apparatus according to claim 7, wherein an imaging pixel arrangement is set in accordance with a sampling theorem for a region in which a spatial transfer characteristic of the imaging optical system in a central portion of the imaging surface is substantially uniform.

10. An image acquisition apparatus according to claim 6, wherein an interval between adjacent pixels of the plurality of imaging pixels is set randomly.

11. An image acquisition apparatus according to claim 6, wherein the imaging section is a mosaic color-type imaging element.

12. An image acquisition apparatus according to claim 11, wherein an arrangement of a plurality of imaging pixels to which same color filters are mounted is such that an interval between adjacent pixels is set randomly.

13. An image acquisition apparatus according to claim 6, wherein a coefficient sequence recorded in the matrix element memory includes coefficients corresponding to x imaging pixels which are objects of computation when one predetermined display pixel is restored, and a coefficient sequence recorded in the address memory includes coefficients expressing addresses of these x imaging pixels, and the sum of products computation processor executes sum of products computation between observed values and the coefficients corresponding to these x imaging pixels when the one display pixel is restored, and coefficient sequences corresponding to all of the display pixels are recorded in the matrix element memory and the address memory.

14. An image acquisition apparatus according to claim 13, wherein a value of x of the x imaging pixels, which are objects of computation when one predetermined display pixel is restored, changes in accordance with the display pixel.

15. An image acquisition apparatus according to claim 13, wherein a coefficient sequence recorded in the matrix element memory is a coefficient sequence which is determined by extracting elements necessary for restoration of a discrete image with respect to a discrete-to-continuous pseudo-inverse matrix operator defined for a continuous-to-discrete observation operator, a continuous-to-discrete resampling operator discretizing a continuous image virtually restored by operating the discrete-to-continuous pseudo-inverse matrix operator with respect to a discrete observation vector, and one restoration matrix formed by linearly joining the discrete-to-continuous pseudo-inverse matrix operator and the continuous-to-discrete resampling operator, and a coefficient sequence recorded in the address memory is a coefficient sequence expressing an address of an imaging pixel corresponding to the extracted coefficient when a necessary element is extracted from the restoration matrix.

16. An image acquisition apparatus according to claim 15, wherein operation for extracting the necessary element from the restoration matrix is realized by extracting an element whose value is a predetermined threshold value or more.

17. An image acquisition apparatus according to claim 15, wherein operation for extracting the necessary element from the restoration matrix is realized by defining a neighboring range of a position corresponding to the display pixel.

18. An image acquisition apparatus comprising:
an imaging optical system selected from a plurality of types of imaging optical systems;
an imaging section which has a plurality of imaging pixels disposed at uniform intervals in an imaging surface, and picks up an object image imaged by the imaging optical system to convert the object image into image signals;
a specifying section which specifies an imaging pixel corresponding to a type of the selected imaging optical system; and
an image restoration processing section which has a coefficient memory in which a predetermined coefficient sequence is recorded, and an image restoration processing circuit which reads out a coefficient sequence corresponding to the type of the selected imaging optical system from the coefficient memory and which carries out computation processing between the read-out coefficient sequence and the image signal from the imaging section, the image restoration processing section generating an image in a desired image display pixel arrangement.

19. An image acquisition apparatus according to claim 18, wherein the imaging optical system has a memory in which information of the type of the imaging optical system is recorded.

20. An image acquisition apparatus according to claim 18, wherein the imaging section is configured such that, by accessing only imaging pixels specified when reading charges from the imaging element, an imaging pixel arrangement suited for the type of the imaging optical system can be realized.

21. An image acquisition apparatus according to claim 20, wherein the imaging section has a memory in which is recorded imaging pixel address data of a plurality of types suited to a plurality of imaging optical systems, and by reading-out therefrom one type of imaging pixel address data corresponding to the imaging optical system actually used, only imaging pixels specified when reading charges from the imaging element are accessed.

22. An image acquisition apparatus according to claim 18, wherein the coefficient memory records a plurality of types of coefficient sequences suited for a plurality of imaging optical systems, and by reading-out therefrom one type of coefficient sequence corresponding to the imaging optical system actually used, computation processing is carried out by using a coefficient sequence suited to the type of the imaging optical system.

* * * * *